US011685202B2

(12) United States Patent
Fenton et al.

(10) Patent No.: US 11,685,202 B2
(45) Date of Patent: Jun. 27, 2023

(54) TOOLING AND METHOD FOR GALVANIZING KINGPIN COUPLER

(71) Applicant: STI Holdings, Inc., Stoughton, WI (US)

(72) Inventors: Gary Lynn Fenton, Edgerton, WI (US); Matthew Simon Kinsman, Fort Atkinson, WI (US)

(73) Assignee: STI HOLDINGS, INC., Stoughton, WI (US)

( * ) Notice: Subject to any disclaimer, the term of this patent is extended or adjusted under 35 U.S.C. 154(b) by 135 days.

(21) Appl. No.: 17/372,816

(22) Filed: Jul. 12, 2021

(65) Prior Publication Data
US 2021/0339585 A1 Nov. 4, 2021

Related U.S. Application Data

(62) Division of application No. 15/944,119, filed on Apr. 3, 2018, now Pat. No. 11,077,728.

(51) Int. Cl.
*B60D 1/01* (2006.01)
*B60D 1/60* (2006.01)
*B62D 53/08* (2006.01)

(52) U.S. Cl.
CPC ............ *B60D 1/015* (2013.01); *B60D 1/605* (2013.01); *B62D 53/0842* (2013.01)

(58) Field of Classification Search
CPC ..... B60D 1/015; B60D 1/605; B62D 53/0842
See application file for complete search history.

(56) References Cited

U.S. PATENT DOCUMENTS

| 1,184,315 | A | 5/1916 | Buch |
| 2,897,588 | A | 8/1959 | Chapman |
| 3,415,085 | A | 12/1968 | Eble, Jr. |
| 3,600,914 | A | 8/1971 | Johnson et al. |
| 3,667,988 | A | 6/1972 | Horiki |
| 3,772,057 | A | 11/1973 | Whitley |
| 3,843,149 | A | 10/1974 | Whitley |
| 4,264,652 | A | 4/1981 | Danese et al. |

(Continued)

OTHER PUBLICATIONS

MIcMaster-Carr "Low-Pressure Pipe Fitting" retrieved from the Internet at https://www.mcmaster.com on Nov. 13, 2017.

(Continued)

*Primary Examiner* — Kevin Hurley
*Assistant Examiner* — Marlon A Arce
(74) *Attorney, Agent, or Firm* — Michael Best & Friedrich LLP

(57) ABSTRACT

A king pin coupler assembly of a fifth wheel coupling. A coupler plate has a king pin aperture therein. A king pin is positioned to extend axially through the king pin aperture of the coupler plate. The king pin has a first portion with a neck for engaging a fifth wheel of the fifth wheel coupling, the first portion extending to a first side of the coupler plate. The king pin has a second portion on a second side of the coupler plate and welded to the coupler plate. A shielding apparatus is secured to one or both of the king pin and the coupler plate. The shielding apparatus includes a cover sealed to the first side of the coupler plate. The cover extends over the first portion of the king pin to shield the first portion of the king pin during liquid immersion of the king pin coupler assembly.

8 Claims, 11 Drawing Sheets

(56) References Cited

U.S. PATENT DOCUMENTS

| | | | |
|---|---|---|---|
| 4,704,883 A | 11/1987 | Dykes | |
| 5,961,140 A | 10/1999 | Huskey | |
| 6,394,480 B1 | 5/2002 | Brennan | |
| 6,967,041 B1 | 11/2005 | Jarvis et al. | |
| 8,485,544 B2 | 7/2013 | McNeil et al. | |
| 9,242,684 B2 | 1/2016 | NcNeil et al. | |
| 10,919,579 B2 * | 2/2021 | McCloud | B62D 25/2054 |
| 11,077,728 B2 * | 8/2021 | Fenton | B60D 1/015 |
| 2005/0252256 A1 | 11/2005 | Escalante, III | |
| 2007/0029758 A1 | 2/2007 | Maffey et al. | |
| 2015/0224835 A1 * | 8/2015 | Ehrlich | C23C 4/129 |
| | | | 29/460 |
| 2016/0185403 A1 | 6/2016 | Wylezinski | |

OTHER PUBLICATIONS

McMaster-Carr "Thick-Wall Welded Steel Pipe Nipple" retrieved from the Internet at https://www.mcmaster.com on Nov. 13, 2017.
McMaster-Carr "Standard-Wall Steel Pipe" retrieved from the Internet at https://www.mcmaster.com on Nov. 13, 2017.

* cited by examiner

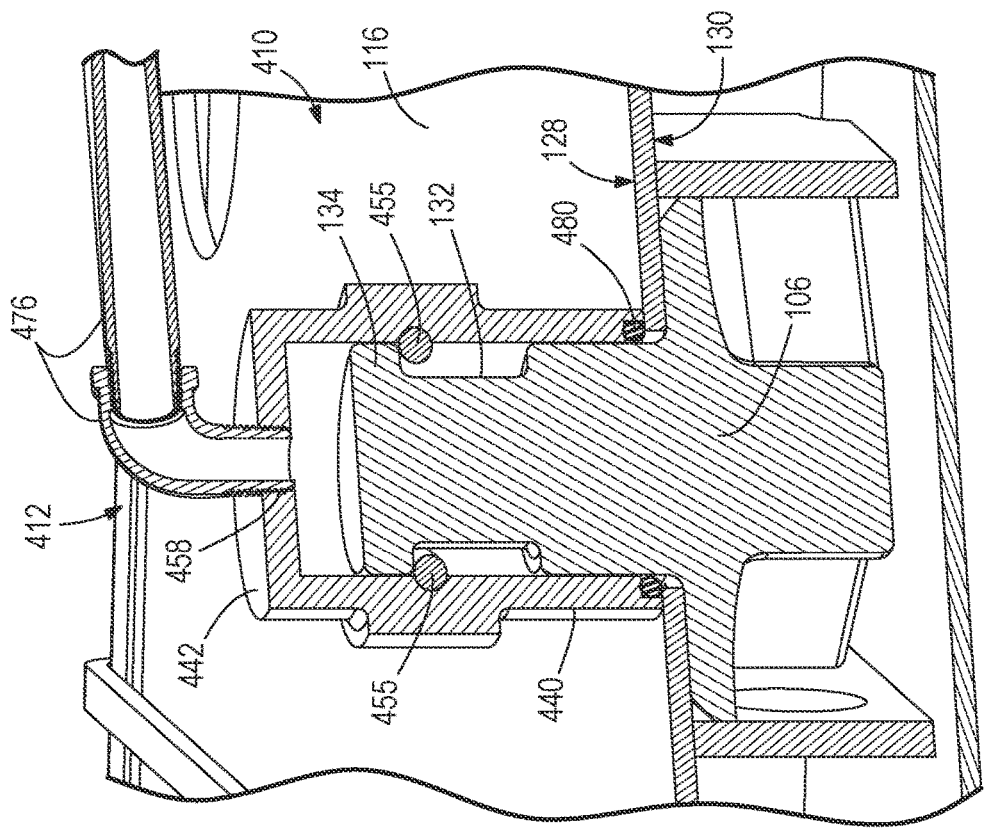
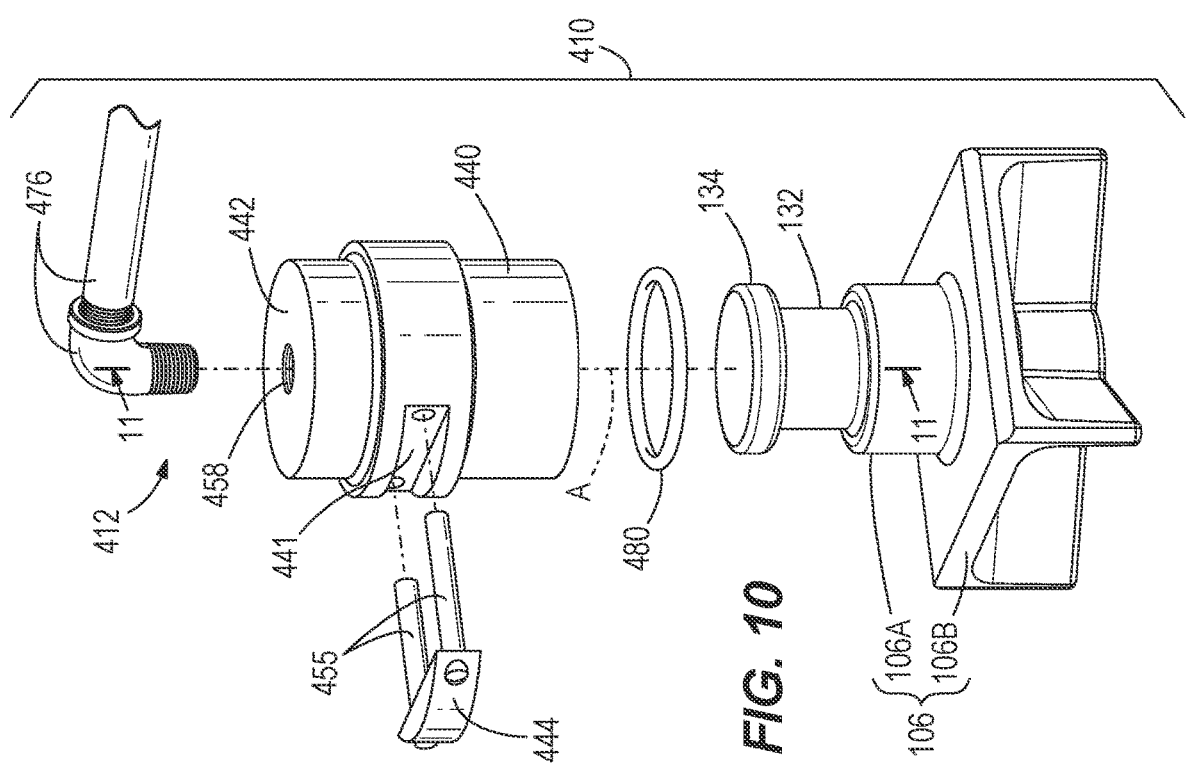

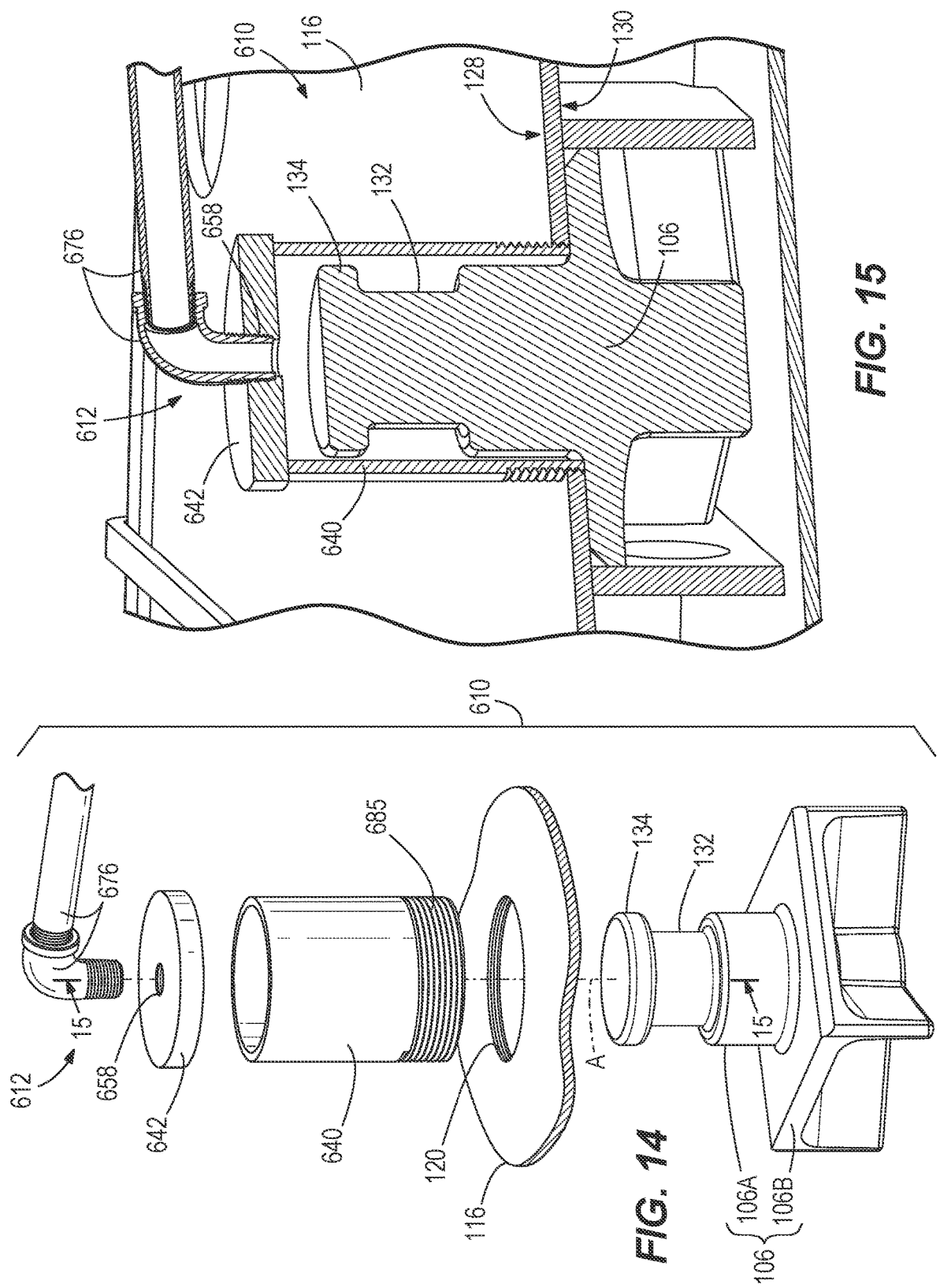

TOOLING AND METHOD FOR GALVANIZING KINGPIN COUPLER

CROSS-REFERENCE TO RELATED APPLICATIONS

This application is a divisional of and claims priority to U.S. patent application Ser. No. 15/944,119, filed on Apr. 3, 2018, the entire contents of which are incorporated by reference herein.

BACKGROUND

The invention relates to over-the-road trailers and in particular, the king pin coupler assembly of the trailer for establishing attachment with a truck or semi-tractor, such couplings known as fifth wheel couplings. The invention relates particularly to hot dip galvanizing of a king pin coupler assembly, which, if done by conventional means, takes place prior to installation of the king pin such that the king pin does not enter the hot dip galvanizing bath.

SUMMARY

In one aspect, the invention provides a king pin coupler assembly of a fifth wheel coupling. A coupler plate has a king pin aperture therein. A king pin is positioned to extend axially through the king pin aperture of the coupler plate. The king pin has a first portion with a neck adapted to engage a fifth wheel of the fifth wheel coupling, the first portion extending to a first side of the coupler plate. The king pin has a second portion on a second side of the coupler plate and welded to the coupler plate. A shielding apparatus is secured to one or both of the king pin and the coupler plate. The shielding apparatus includes a cover sealed to the first side of the coupler plate. The cover extends over the first portion of the king pin to shield the first portion of the king pin during liquid immersion of the king pin coupler assembly.

In another aspect, the invention provides a method of manufacturing a king pin coupler assembly of a trailer. A coupler plate is provided having a king pin aperture therein. A king pin is positioned within the king pin aperture so that a first portion of the king pin having a neck extends to a first side of the coupler plate and a second portion of the king pin extends to a second side of the coupler plate. The king pin is welded to the coupler plate to fix the king pin in position within the king pin aperture. A shielding apparatus is applied to cover the first portion of the king pin. The coupler plate, with the king pin welded thereto and shielded by the shielding apparatus, is immersed into a hot dip galvanizing bath. The coupler plate is removed from the hot dip galvanizing bath, and the shielding apparatus is removed.

BRIEF DESCRIPTION OF THE DRAWINGS

FIG. 10 is an exploded assembly view of a king pin coupler assembly with a shielding apparatus according to a third alternate embodiment.

FIG. 11 is a cross-section of the assembled shielding apparatus, taken along line 11-11 of FIG. 10.

FIG. 14 an exploded assembly view of a king pin coupler assembly with a shielding apparatus according to a fifth alternate embodiment.

FIG. 15 is a cross-section of the assembled shielding apparatus, taken along line 15-15 of FIG. 14.

DETAILED DESCRIPTION

Figure 1:
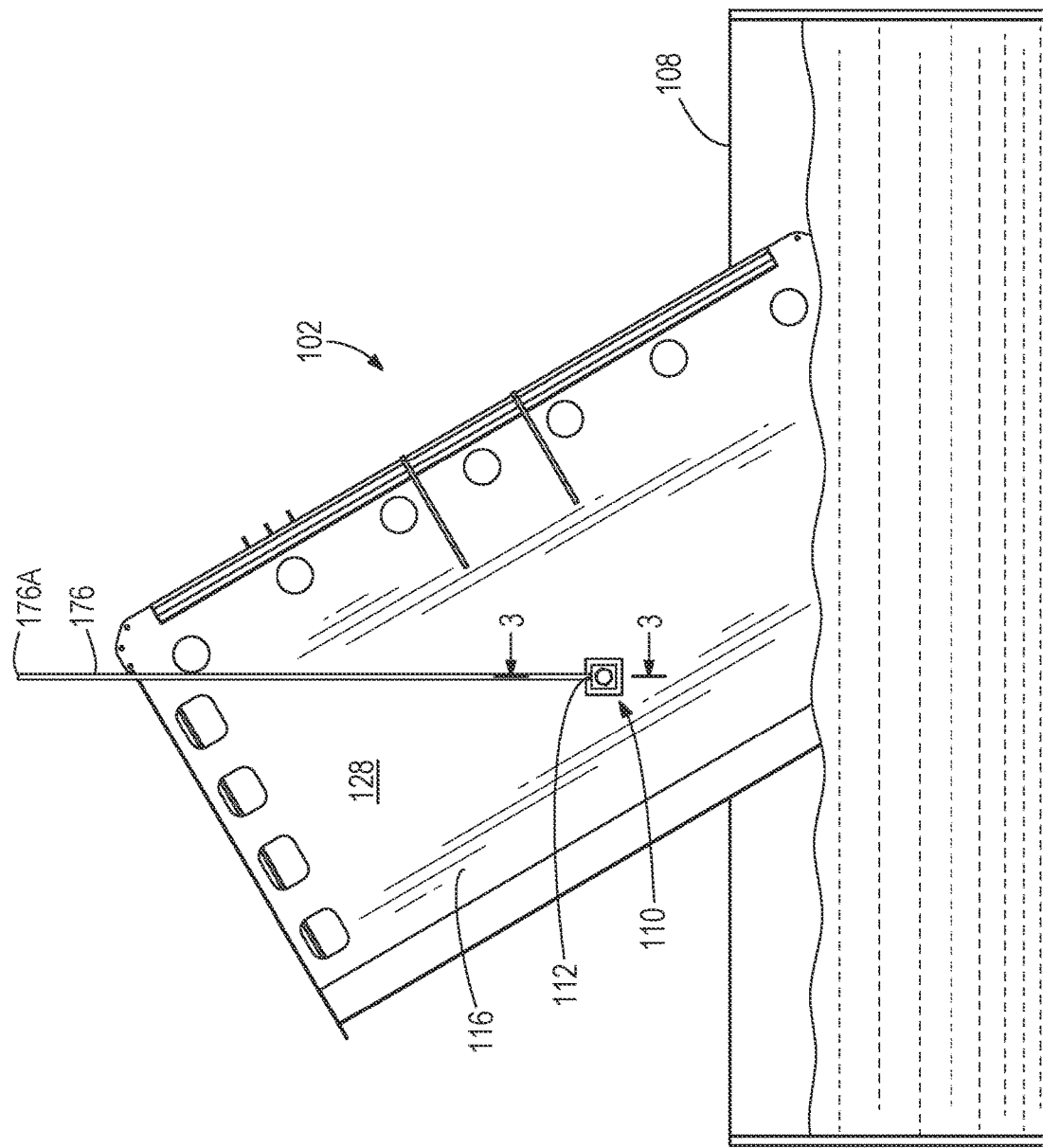
FIG. 1 is a side view of a king pin coupler assembly being immersed in a hot dip galvanizing bath.

FIG. 1 illustrates a trailer coupler structure, particularly a king pin coupler assembly 102, at a manufacturing phase prior to installation into a trailer 104 (FIG. 5) as part of a fifth wheel coupling in which a semi-tractor or other truck is provided with a fifth wheel that receives a king pin 106 of the coupler assembly 102 so that the truck can pull the trailer 104 and the trailer 104 can articulate about the king pin with respect to the truck. As described in further detail below, the king pin coupler assembly 102 is at least partially assembled to include the king pin 106 when galvanized by immersion in a hot zinc galvanizing bath 108 prior to installation into the trailer 104. At least during the hot dip galvanization, the king pin coupler assembly 102 can include a shielding apparatus 110 to protect the king pin 106 from the heat of the hot zinc galvanizing bath 108, which is a bath of molten zinc in the range of 435 to 455 degrees Celsius. The shielding apparatus 110 prevents the forged steel king pin 106 from receiving the galvanized coating, but more importantly prevents the heat of the hot zinc bath 108 from softening a surface of the king pin 106, which may previously be hardened by heat treatment (e.g., case hardened). Although the shielding apparatus 110 can seal around the king pin 106, an interior of the shielding apparatus 110 may be vented by a vent structure 112, such as a vent tube, as shown in FIG. 1 to avoid heat and pressure build-up therein. Although features of the invention may apply to various trailer configurations, the trailer 104 of FIG. 5 can be an over-the-road commercial transport trailer. The trailer 104 can be an enclosed trailer. The trailer 104 may have multiple wheeled axles. The trailer 104 may have one or more doors at the trailing end, opposite the leading end where the king pin coupler assembly 102 is located.

Figure 2:
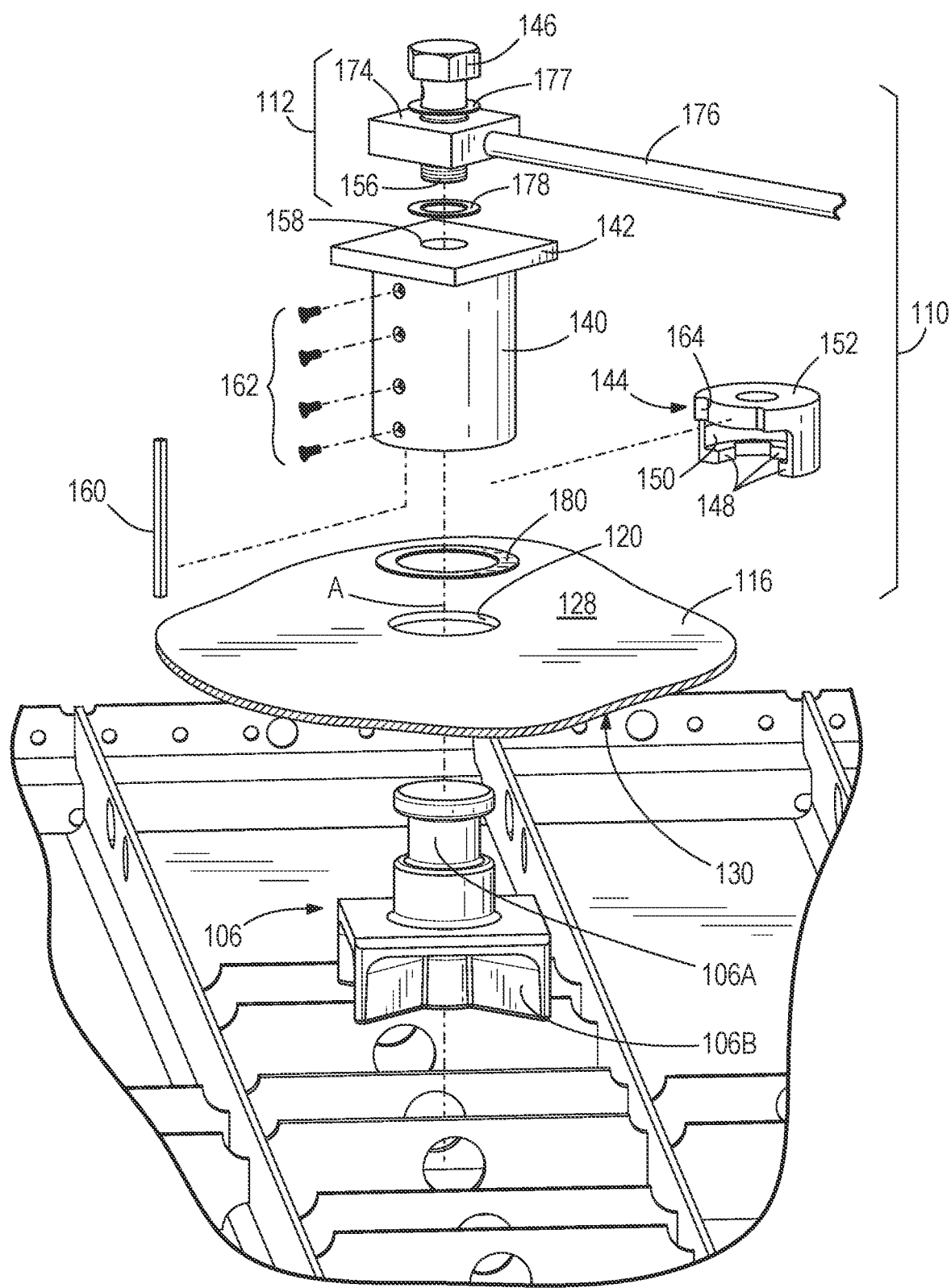
FIG. 2 is an exploded assembly view of a shielding apparatus adapted to cover and vent the king pin of the king pin coupler assembly during hot dip galvanization.
Figure 5:
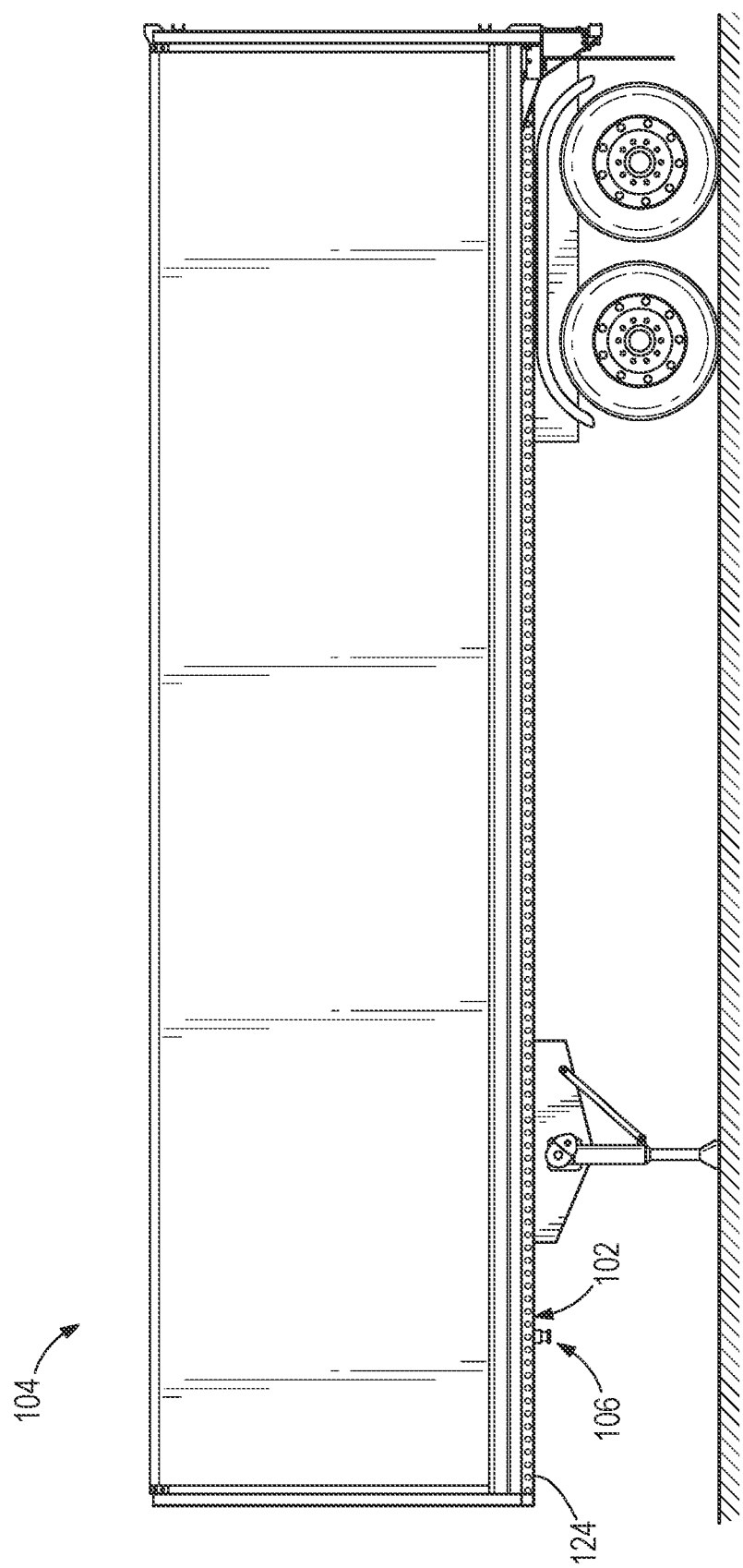
FIG. 5 is a side view of a trailer having the king pin coupler assembly installed therein.

As shown in FIGS. 1 and 2, the king pin coupler assembly 102 includes a coupler plate 116 having a king pin aperture 120 therein. The king pin coupler assembly 102 may further include one or more additional plates, beams, gussets, or other structures (e.g., as a welded assembly of steel components) in addition to the coupler plate 116. The coupler plate 116 may form a lower plate of the king pin coupler assembly 102. As shown in FIG. 5, the king pin 106, which is positioned within the king pin aperture 120 of the coupler plate 116, projects downwardly toward the ground, in the installed orientation. The coupler plate 116 is installed in the floor structure 124 of the trailer 104 and defines a ground-facing surface 128 from which the king pin 106 extends. The ground-facing surface 128 is referred to herein as the first surface or lower surface defining a first side of the coupler plate 116, the coupler plate 116 further having a second or upper surface 130 opposite the lower surface 128 and defining a second side. The king pin 106 has a first portion 106A or "spool" provided with a neck 132 adapted to engage the truck fifth wheel. The neck 132 is defined as a portion of reduced diameter adjacent a head portion 134. The first portion 106A of the king pin 106 is the portion that extends downwardly from the lower surface 128 of the coupler plate 116, the king pin 106 further having a second portion 106B or upper portion on the second or upper side of the coupler plate 116. The second portion 106B of the king pin 106 can be integrally formed as a king pin forging with the first portion 106A. The king pin 106 can be secured to the coupler plate 116 by welding once the king pin 106 is assembled into the aperture 120 (e.g., by welding between the second king pin portion 106B and the upper surface 130 of the coupler plate 116). In some constructions, the second king pin portion 106B is cruciform-shaped and has a rectangular perimeter. The second king pin portion 106B can be perimeter welded to the coupler plate 116.

The shielding apparatus 110 is secured to one or both of the king pin 106 and the coupler plate 116 for shielding or protecting the king pin 106 during galvanizing as mentioned above. For this purpose, the shielding apparatus 110 includes a cover 140 provided for sealing an enclosed space around the king pin first portion 106A (e.g., sealing to the first surface 128 of the coupler plate 116). The cover 140 is shaped and sized to extend over the first portion 106A of the king pin 106 to shield the first portion 106A of the king pin 106 during liquid immersion of the king pin coupler assembly 102, for example, during hot dip galvanizing in the zinc bath 108. The cover 140 can be of cylindrical form, among other shapes. The cover 140 can be formed as a single component, or as two or more pieces. For example, an end cap portion 142 can be provided integrally with the cover 140 or separately from it. A retainer is provided to engage the king pin 106 and retain the cover 140 in position with respect to the king pin 106. In the illustrated construction, the retainer can be provided by a lock plate 144 and a fastener 146. The lock plate 144 is provided with one or more lips or tangs 148 that fit into the neck 132 of the king pin 106, while the head 134 of the king pin is received into a receptacle 150 of the lock plate 144. Rather than an annular component, the lock plate 144 can be open to one lateral or transverse side (in addition to being open on one axial end for passage of a base part of the king pin 106) for sliding onto the king pin 106 in a direction transverse to an axis A of the king pin 106. An end or head 152 of the lock plate 144 is provided with a threaded portion 154 for engagement with a threaded portion 156 of the fastener 146. The fastener 146 extends through an aperture 158 in the end cap portion 142 to engage the lock plate 144. In the illustrated construction, the threaded portion 156 of the fastener 146 is a male thread and the threaded portion 154 is a threaded aperture, although male and female threads may be reversed in some constructions. An outer diameter of the lock plate 144 is smaller than an interior diameter of the cover 140 so that the cover 140 can fit (e.g., slide axially) over the lock plate 144 with clearance.

An anti-rotation interface is defined between the cover 140 and the lock plate 144 to allow the fastener 146 to be tightened with the lock plate 144 by holding the cover 140, and thus the lock plate 144, against rotation. To provide the anti-rotation interface, a portion of the cover 140 extends radially into a portion of the lock plate 144, or vice versa. As illustrated, a radially inwardly projecting portion of the cover 140 is provided by a spine or rib 160 secured to an interior wall of the cover 140 (e.g., by one or a group of fasteners 162, or alternately by welding, bonding, etc.). In other constructions, the rib 160 is not secured to an interior wall of the cover 140 but rather provided integrally as part of the cover 140. The rib 160 extends axially but may extend in other directions in other constructions. A notch 164 is defined in the lock plate 144 to receive and rotationally interfere with the rib 160 so that any allowed rotation between the cover 140 and the lock plate 144 is limited to less than one revolution. Preferably, the notch 164 operates with the rib 160 to limit rotation between the cover 140 and the lock plate 144 to one half revolution (i.e., 180 degrees about the axis A) or less (e.g., 90 degrees or less). The notch 164 and the rib 160 provide a keyed fit between the cover 140 and the lock plate 144, and the amount of free play about the axis A may be set to a desired amount to limit the available relative rotation.

Figure 3:
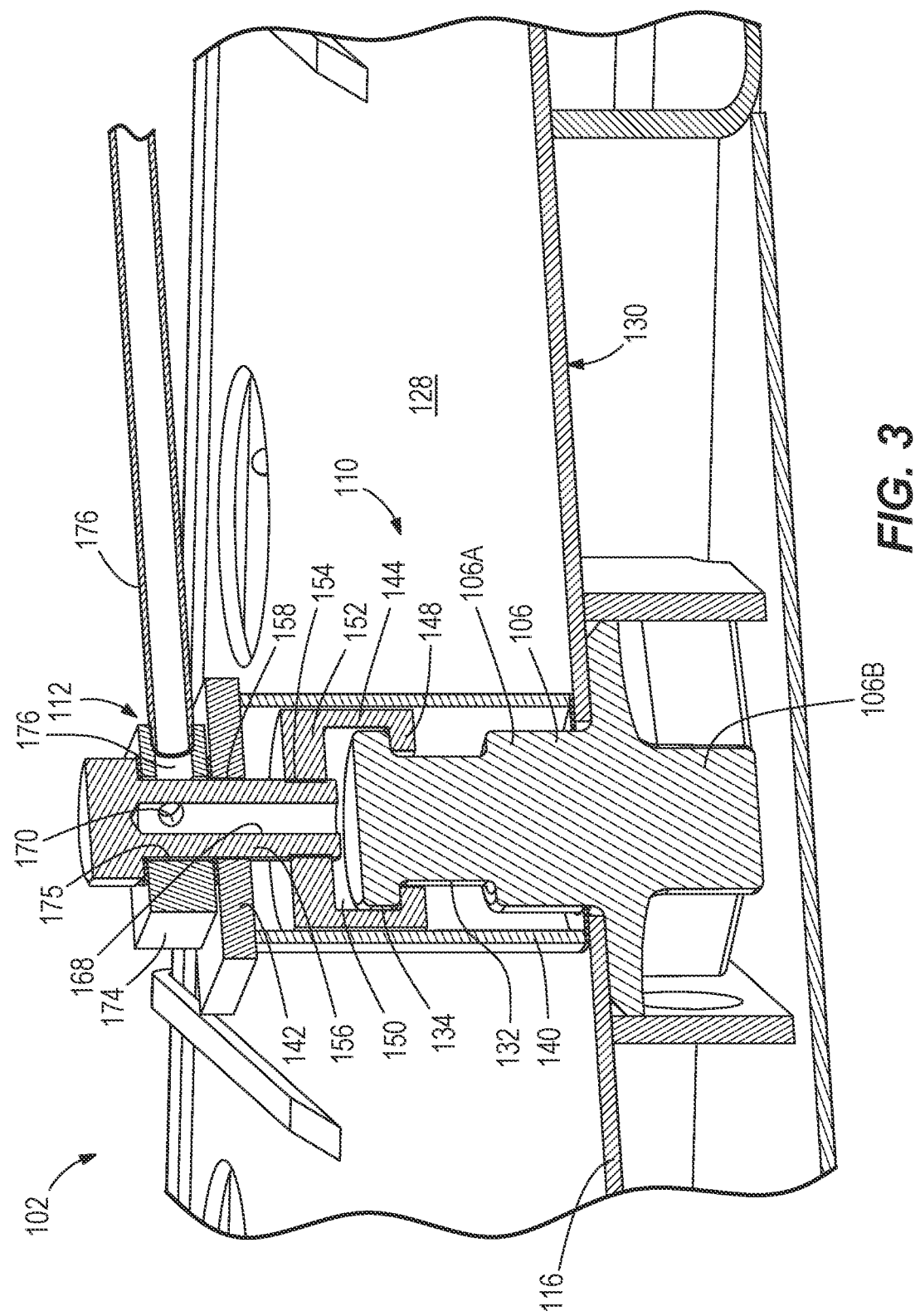
FIG. 3 is a cross-section of the assembled shielding apparatus, taken along line 3-3 of FIG. 2.
Figure 3A:
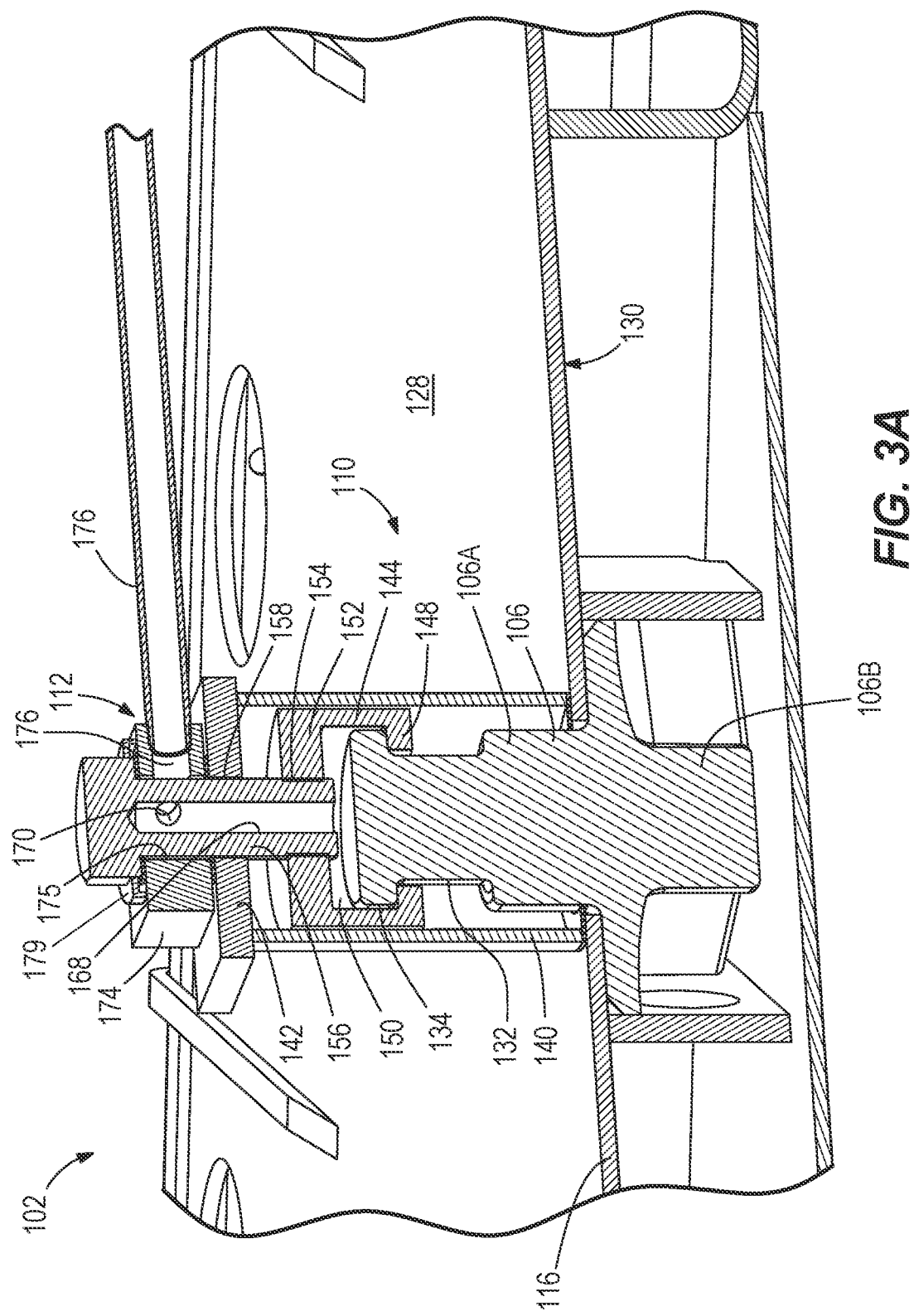
FIG. 3A is a cross-section similar to FIG. 3, illustrating a modified shielding apparatus.

The cover 140, at a first or proximal end thereof, is sealed to the first surface 128 of the coupler plate 116, and a second or distal end of the cover 140 opposite the first end is coupled to the vent structure 112 for coupling an interior of the cover 140 with the external atmosphere. In this regard, the fastener 146 of the illustrated construction is provided as a hollow or vented bolt having an axial bore 168 and at least one cross-bore 170 intersecting with the axial bore 168. As illustrated, the cross-bore 170 is positioned at a portion of the fastener 146 that is outside the cover 140, in other words, axially beyond the end cap portion 142. Although not required in all constructions, the cross-bore 170 extends through the wall of the fastener 146 on both sides of the axial bore 168, and as such may also be considered to form two co-axial cross-bores 170. As part of the vent structure 112, the portion of the fastener 146 having the cross-bore 170 therein is positioned axially at a position within a banjo plate 174 having a hollow conduit 176 such as a tube or pipe coupled thereto. The fastener 146 extends through an aperture 175 in the banjo plate 174 that is aligned with the aperture 158 in the end cap portion 142. As illustrated, a head of the fastener 146 is axially compressed against an outer end of the banjo plate 174 (e.g., with a gasket 177 therebetween) by tightening of the fastener 146 with the lock plate 144. An inner end of the banjo plate 174 is axially compressed against the end cap portion 142 (e.g., with a gasket 178 therebetween) by tightening of the fastener 146 with the lock plate 144. In some constructions, any or all of the gaskets 177, 178, and the gasket 180 at the other end of the cover 140 can be formed of graphite. FIG. 3B illustrates the same shielding assembly 110 as FIGS. 2 and 3, with the addition of a modified feature for protecting the gasket 177 from zinc build-up. In particular, the fastener 146 includes—integrally or attached thereto—a flange 179 having a portion extending toward the banjo plate 174, surrounding the gasket 177. The flange 179 may touch the banjo plate 174 or be within 1 or 2 mm thereof so that the area of the gasket 177 is at least partially blocked or impeded from exposure to the galvanizing bath 108 to avoid an excessive build-up of zinc.

The addition of such a flange is not limited to the fastener 146, and may be incorporated into any or all of the banjo plate 174, the cap portion 142, or the bottom of the cover 140 (for any or all of the gaskets 177, 178, 180).

The hollow conduit 176 functions as a snorkel to allow fluid communication (e.g., of air) between the interior of the cover 140 and the surrounding atmosphere (i.e., outside the molten zinc of the galvanizing bath 108) during the galvanization process. In other words, the king pin coupler assembly 102, including the entire coupler plate 116, is submerged in the molten zinc of the bath 108, while an open end 176A (FIG. 1) of the hollow conduit 176 remains above the liquid level in the bath 108. The hollow conduit 176, as part of the vent structure 112, provides a path for the free escape of air, which may be rapidly heated from the galvanization process. At the end of the cover 140 adjacent the first surface 128 of the coupler plate 116, a sealed interface is created therebetween, and the interface may include a gasket 180. During the galvanization process, the king pin coupler assembly 102 receives a hot dip galvanized coating extending up to the interface where the cover 140 is sealed to the first side of the coupler plate 116. The shielding apparatus 110, including the cover 140, shields the first portion 106A of the king pin 106 from receiving the galvanized coating, but more importantly shields the first portion 106A from the associated heat inherent in the hot dip galvanizing process so that the pre-existing heat treatment of the material of the first portion 106A remains intact. To further limit the heat exposure to the first portion 106A of the king pin 106, additional measures may be taken. For example, any or all of the components of the shielding apparatus 110 may be constructed of materials (e.g., metals) of relatively low thermal conductivity, such as 50 W/mK or less and in some cases 25 W/mK or less (at standard atmospheric pressure and 20 degrees Celsius). This may include certain carbon steels, stainless steels, or titanium, for example. This may apply to any or all of the cover 140, the end cap portion 142, the lock plate 144, the rib 160, the fasteners 162, the gaskets 177, 178, 180, the fastener 146, and the banjo plate 174. In other constructions, one, some, or all of these components can alternately be constructed of a non-metal material having a thermal conductivity of 10 W/mK or less (at standard atmospheric pressure and 20 degrees Celsius), assuming the material has an adequately high melting point (e.g., over 450 degrees Celsius) to withstand the hot dip galvanizing bath 108.

In some constructions, an additional coating or surface treatment may be applied to any or all of the components of the shielding apparatus 110 or portions thereof, and/or directly to the king pin 106 (e.g., the second portion 106B of the king pin 106, which may be directly exposed to the hot galvanizing bath 108). Such a coating can be a ceramic coating on one or both of the shielding apparatus 110 and the king pin second portion 106B. Thus, even when these parts are directly exposed to the heat of the molten zinc in the galvanizing bath 108, they transfer heat less readily so that the resultant heating of the first portion 106A of the king pin 106 can be further limited. A similar type of coating or surface treatment may be applied elsewhere, for example, at either or both sides of the interface between the coupler plate 116 and the cover 140 and/or at either or both sides of an interface between the king pin 106 and the inside of the lock plate 144. Alternately, or in addition to any of the above mentioned mechanisms for limiting heat transfer, a liquid may be provided inside the cover 140, directly surrounding the king pin first portion 106A. The liquid (e.g., water, or more particularly a water solution containing a corrosion inhibitor) may have a boiling point below the temperature of the hot dip galvanizing bath 108 (e.g., boiling point equal to or less than the melting point of zinc) so that the liquid boils off and escapes as vapor through the vent structure 112. Thus, a significant amount of heat is absorbed, without being transferred to the king pin first portion 106A and the liquid acts as a sacrificial king pin protectant fluid. The heat-absorbing liquid may at least partially fill the interior or the cover 140, covering a majority or the entirety of the exterior surface of the king pin first portion 106A.

As mentioned above, a ceramic coating may be useful in limiting heat transfer when applied to the king pin or the shielding apparatus 110 component(s). Such a ceramic coating on the shielding apparatus 110 component(s) may serve an additional benefit in extending the service life of the shielding apparatus 110, part or all of which may be re-used over and over with numerous batches of king pin coupler assemblies 102 in a processing facility. Throughout repeated use and exposure to acid baths and the galvanizing bath 108, base metal can wear way and/or zinc layers can build-up on the components, causing rework or replacement. Other types of coatings or surface treatments that may be used in specifically addressing the protection and longevity of the shielding apparatus 110 component(s) can include: nitriding, ferritic nitrocarburizing (or "Melonite", "Tennifer"/"Tenifer"), (iron, zinc, or manganese) phosphating (or "Parkerizing"), coatings of titanium nitride (TiN and variants thereof), Nickel Boron (NiB), chromium plating (or "chrome"), post-oxidation black oxide, or molybdenum disulfide ($MoS_2$). Such coatings or surface treatments can act as a protector to ensure that the component(s) of the shielding apparatus 110 can have a greater expected useable lifespan and/or greater in-service time prior to re-work or cleaning.

Although the hot dip galvanized coating is applied up to the interface where the cover 140 is sealed to the first side of the coupler plate 116, a method of preparing the king pin coupler assembly 102 for galvanization may include, prior to assembling the cover 140 over the king pin first portion 106A, and optionally prior to placement of the king pin 106 into the aperture 120, applying a spray-on zinc coating or "cold galvanized coating" to an area of the first surface 128 radially surrounding the aperture 120. The cold galvanized coating may extend completely to the perimeter defined by the aperture 120 in some constructions. The cold galvanized coating may extend radially outward past the interface defined by the cover 140. In other words, the first surface 128 can include a cold galvanized coating extending beyond an outer diameter of the cover 140 at its proximal end, and/or beyond an outer diameter of the gasket 180. In some constructions, a spray-on zinc coating or "cold galvanized coating" may be applied to an area of the second surface 130 of the coupler plate 116 radially surrounding the aperture 120. The cold galvanized coating may extend completely to the perimeter defined by the aperture 120 in some constructions. The cold galvanized coating may extend radially outward past the interface defined between the second surface 130 and the second portion 106B of the king pin 106. In some constructions, the cold galvanized coating is applied to the second surface 130 prior to welding the perimeter of the king pin second portion 106B to the second surface 130, such that even the portion of the surface 130 under the weld has been coated with zinc. Zinc oxide fumes released during welding may be collected by an appropriate mitigation device such as a fume hood.

Figure 4:
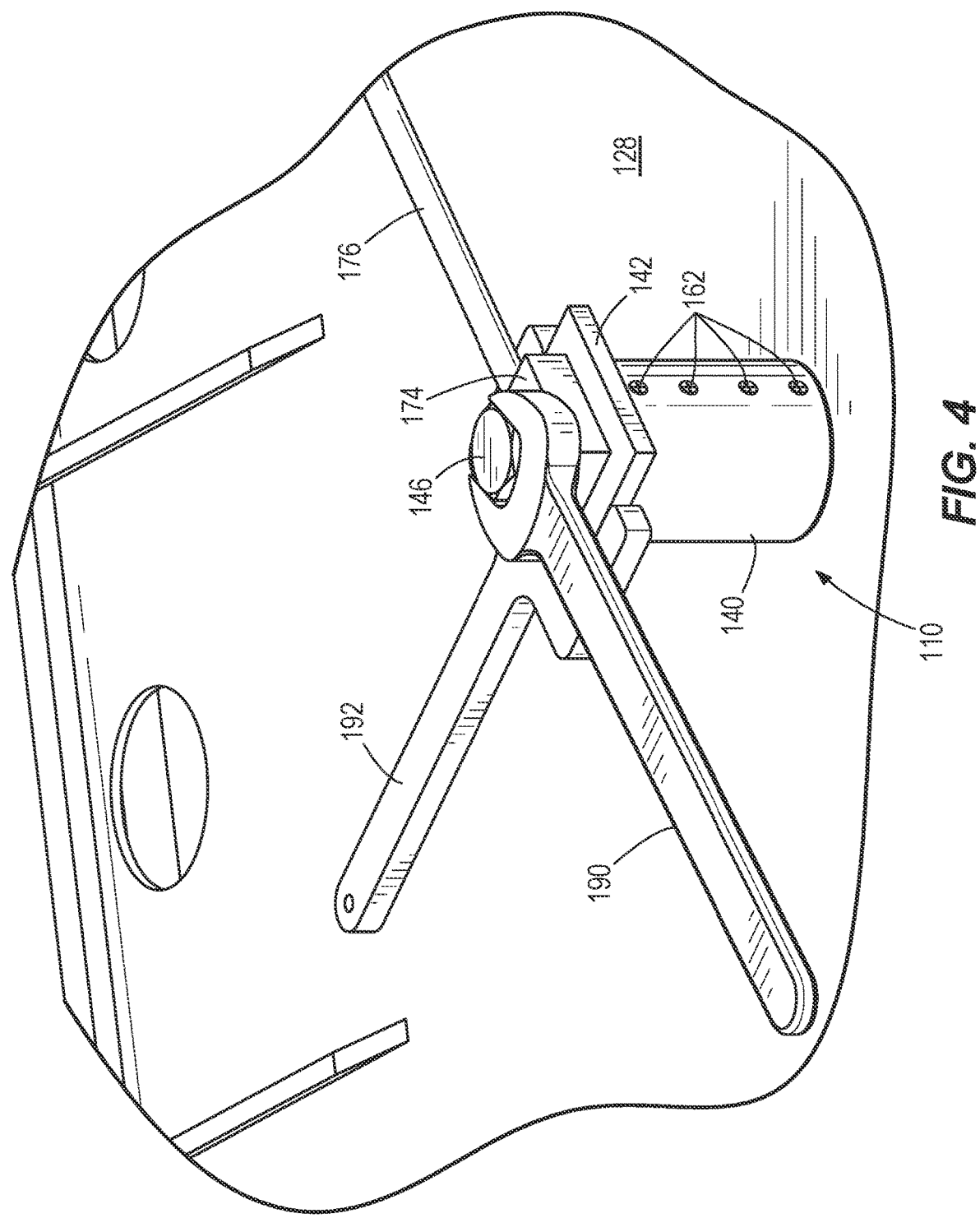
FIG. 4 is a perspective view illustrating the assembly of the shielding apparatus with first and second tools.

FIG. 4 illustrates a latter portion in the assembly process of the shielding apparatus 110 over the king pin 106. After sliding the lock plate 144 onto the king pin first portion 106A, transverse to the axis A, the cover 140 including end cap portion 142 are slid axially over the king pin 106 and the lock plate 144 such that the rib 160 is positioned within the notch 164. With the banjo plate 174 and the gaskets 177, 178, 180 in place, the fastener 146 is threaded into the aperture 154 in the lock plate 144. The fastener 146 can then be tightened by a tool 190 (e.g., a first wrench) engaged with the fastener head, while another tool 192 (e.g., a second wrench) is engaged with the cover 140 to prevent rotation of the cover 140, and thus the lock plate 144 therein. As shown, the second tool 192 is engaged with the end cap portion 142 that has a rectangular, or even square, profile when viewed axially. However, any number of different non-circular shapes may be provided on the end cap portion 142. It is also noted that other engagement points, such as ridges, indentations, etc. may be provided for holding the cover 140 fixed while tightening the fastener 146. Tightening of the fastener 146 clamps the cover 140 axially down onto the first surface 128 of the coupler plate 116 as the tangs 148 of the lock plate 144 are retained against the head of the king pin 106.

Although the structure for providing and securing the shielding apparatus 110 can be provided according to the disclosure of FIGS. 1-4 and the above description, certain variations are also contemplated—some of which are covered in the additional disclosure below with the understanding that further variations and certainly combinations of features disclosed herein will also be considered to be adequately disclosed and enabling to one of ordinary skill in the art by the present application documents. Each alternate embodiment discussed below is focused on a particular set of unique features not already covered by the above disclosure. It will be understood that the above disclosure is relied upon for details that would be redundant if covered again separately below. In general, the additional disclosure below relates to alternate structures for forming a cover that can be retained in place over the king pin 106 of the king pin coupler assembly 102. Although each structure is also vented, as with the shielding apparatus 110 of FIGS. 1-4, it also bears mentioning that the interior of any of the covers disclosed herein may be defined as a sealed container in other constructions. To reduce internal pressure rise from the temperature resulting from immersion in the hot dip galvanizing bath 108, covers according to any particular construction providing a sealed container may rely on low thermal conductivity of materials and/or thermally insulating coatings. Alternately or in addition, a sealed cover may be applied over the king pin under reduced atmospheric pressure (i.e., vacuum) conditions, or may be applied and subsequently evacuated at least partially through a one-way vacuum port.

Figure 7:
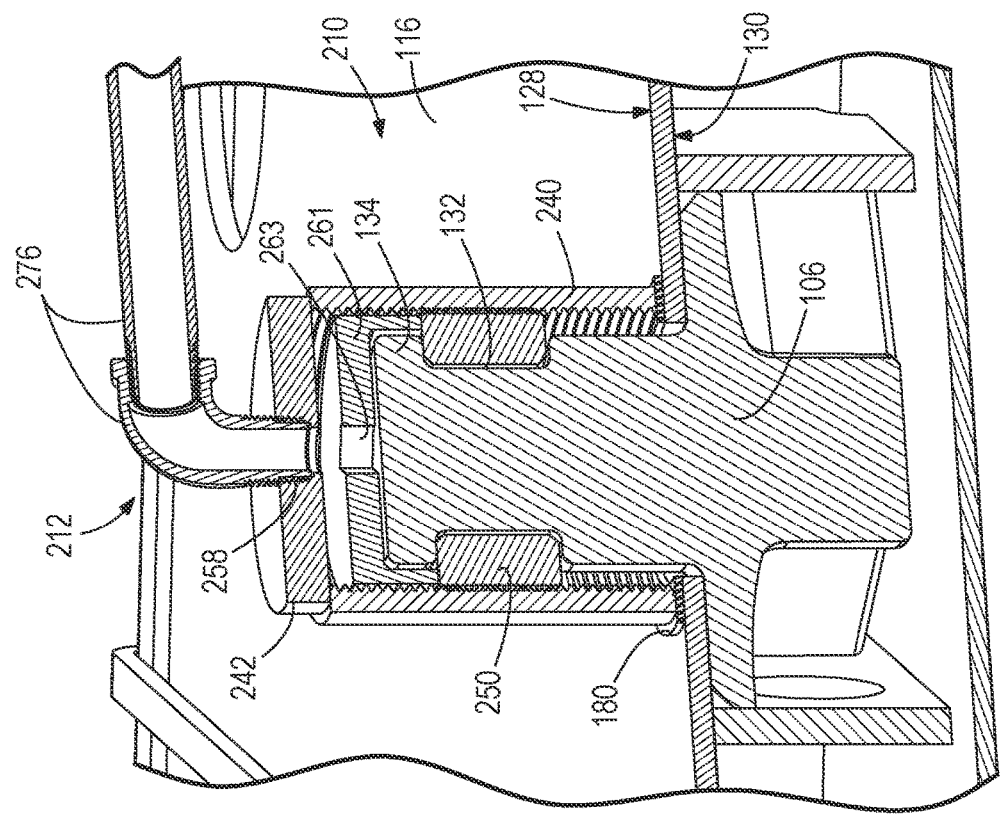
FIG. 7 is a cross-section of the assembled shielding apparatus, taken along line 7-7 of FIG. 6.
Figure 6:
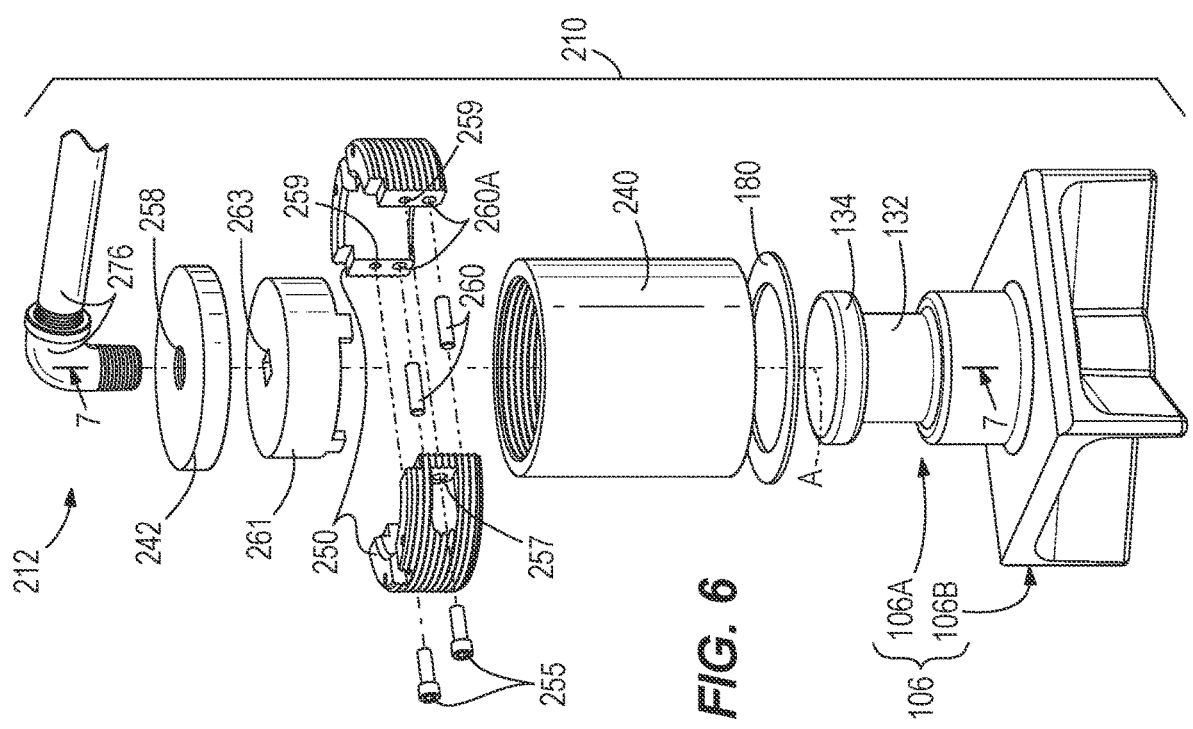
FIG. 6 is an exploded assembly view of a king pin coupler assembly with a shielding apparatus according to a first alternate embodiment.

FIGS. 6-7 illustrate a first alternate construction in which a shielding apparatus 210 for the king pin 106 of the king pin coupler assembly 102 includes a thread-on cover 240. In particular, the cover 240 has a cylindrical shape and an interior wall having female threads. In order to allow the cover 240 to thread into place for sealing at its proximal end to the first coupler plate surface 128, a multi-piece male threaded collar 250 is provided and sized to fit onto the neck 132 of the king pin 106. The threaded collar 250 as illustrated includes two semi-circular pieces that are joined together transverse to the axis A of the king pin 106. The two collar pieces form one complete unitary male threaded shank, although neither individual piece extends about the entire circumference. The pieces of the collar 250 are held together by threaded fasteners 255 in the illustrated construction, with one clearance hole 257 and one female threaded hole 259 among the respective collar pieces for each fastener 255. Additional dowel pins 260 may extend into down pin apertures 260A in both pieces of the collar 250 to maintain proper alignment therebetween. Two fasteners 255 and two dowel pins 260 are used in the illustrated construction. However, the collar 250 can be held together by alternate numbers and/or types of fasteners or by numerous other mechanisms, including but not limited to adhesive, clips, snaps, hooks, etc. The attachment between the pieces of the collar 250 need not be particularly robust as they merely keep the collar 250 in position. In order to allow the tightening of the thread-on cover 240 onto the threaded collar 250 without having the collar 250 spin on the king pin 106, an anti-rotation feature is provided in the form of a cup-shaped locking member 261 forming an anti-rotation interface (e.g., inter-fitting projections and recesses) with the threaded collar 250. An outer end of the cup-shaped locking member 261 includes another anti-rotation feature in the form of a non-circular aperture 263 (e.g., square socket). The aperture 263 is centrally located to align with the aperture 258 provided in the end cap portion 242 of the cover 240. As such, insertion of a tool through the aperture 258 and into the aperture 263 allows a user to hold the orientation of the threaded collar 250 fixed in place while screwing on the thread-on cover 240. The cover 240 may then seal to the first surface 128 of the coupler plate 116 (e.g., with the gasket 180) as the cover 240 is threaded on. Once the cover 240 is tightened, the tool is removed. The aperture 258 can then be sealed closed or coupled to a vent structure 212, which in the illustrated construction includes a hollow conduit 276 in the form of a 90-degree pipe elbow threaded into the aperture 258 and a pipe threaded to the other end of the elbow. The coupler plate 116 is omitted from FIG. 6 for clarity.

Figure 9:
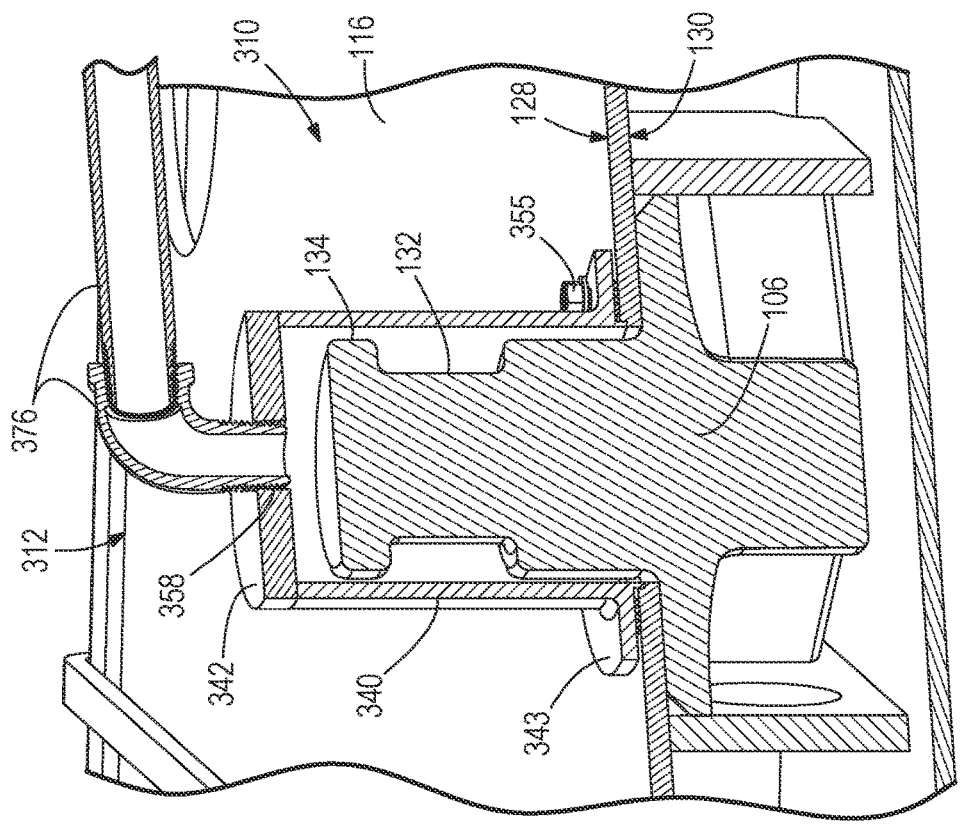
FIG. 9 is a cross-section of the assembled shielding apparatus, taken along line 9-9 of FIG. 8.
Figure 8:
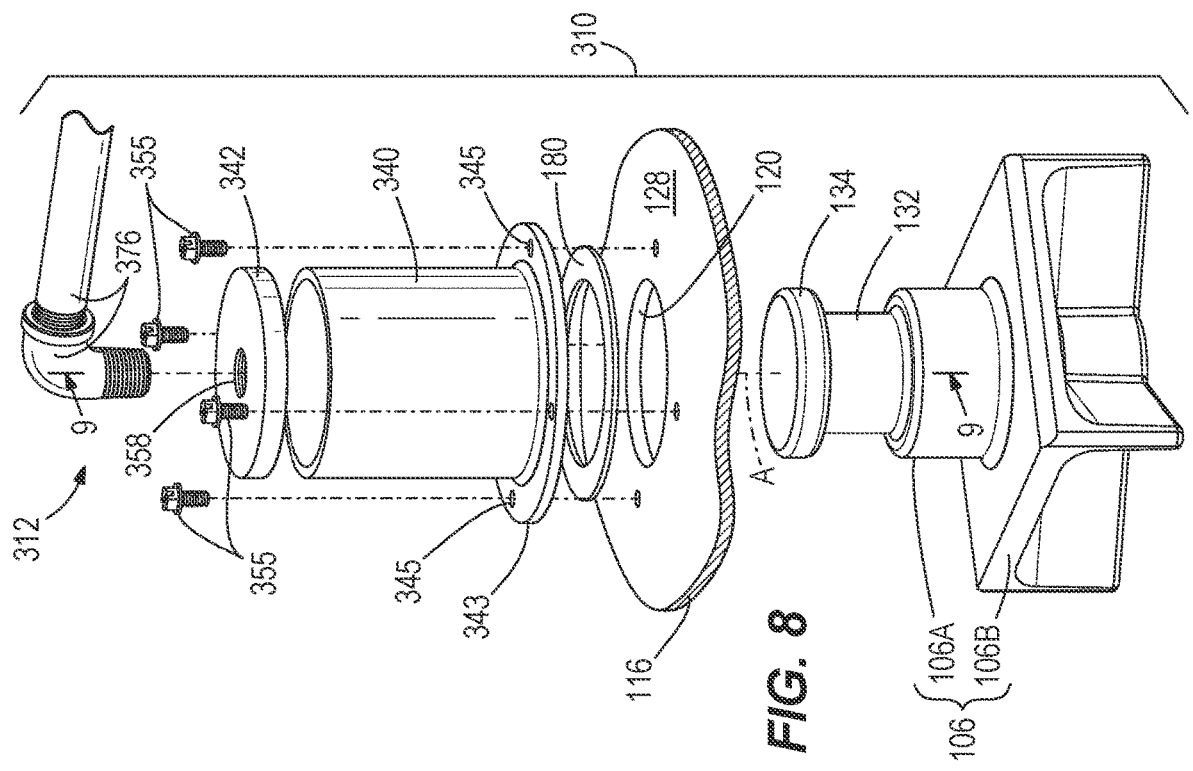
FIG. 8 is an exploded assembly view of a king pin coupler assembly with a shielding apparatus according to a second alternate embodiment.

FIGS. 8-9 illustrate a second alternate construction in which a shielding apparatus 310 for the king pin 106 of the king pin coupler assembly 102 includes a cover 340 with a bolting flange 343 including a plurality of apertures 345. The cover 340 has a wall (e.g., cylindrical wall) encircling the first portion 106A of the king pin 106, and the bolting flange 343 extends perpendicular to the encircling wall. The apertures 345 receive a corresponding plurality of fasteners 355 that pass through the coupler plate 116 and are either engaged directly with the coupler plate 116 (e.g., threaded in) or secured on the second side of the coupler plate 116 to hold the cover 340 down on the first surface 128. In any case, the coupler plate 116 includes a set of apertures around the king pin aperture 120 matching the layout of those in the bolting flange 343. Because the retaining structure for the cover 340 does not rely on any threaded connection within the interior space of the cover 340, there is no need for an anti-rotation feature within the cover 340. A vent structure 312 can be provided if desired in the cover 340. In the illustrated construction, the vent structure 312 is provided with a hollow conduit 376 similar to that of FIGS. 6-7 extending from an aperture 358 in the end cap portion 342 of the cover 340.

FIGS. 10-11 illustrate a third alternate construction in which a shielding apparatus 410 for the king pin 106 of the king pin coupler assembly 102 includes a cover 440 having a sidewall recess 441. The retaining structure for the cover 440 includes a lock plate 444 and corresponding fasteners 455. The fasteners 455 secure the lock plate 444 into the sidewall recess 441 and further engage the head 134 of the king pin 106 adjacent the neck 132 to urge the cover 440 down onto the first surface 128 of the coupler plate 116. In the illustrated construction, the fasteners 455 are threaded into apertures in the cover sidewall opposite the sidewall recess 441. A base end of the cover 440 can include a retaining groove or channel receiving a gasket 480, which is illustrated in the form of an O-ring in the illustrated construction, for sealing to the first surface 128 of the coupler plate 116. In the illustrated construction, the vent structure 412 is provided with a hollow conduit 476 similar to that of FIGS. 6-7 extending from an aperture 458 in the end cap portion 442 of the cover 440. The coupler plate 116 is omitted from FIG. 10 for clarity.

Figure 13:
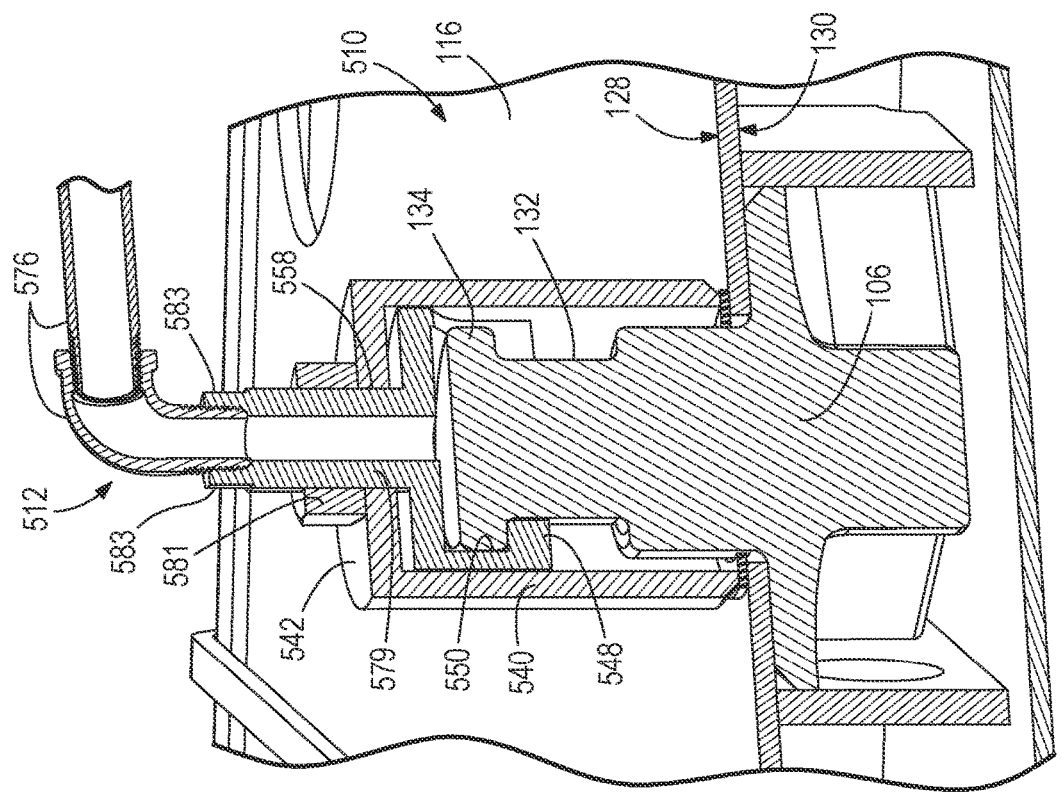
FIG. 13 is a cross-section of the assembled shielding apparatus, taken along line 13-13 of FIG. 12.
Figure 12:
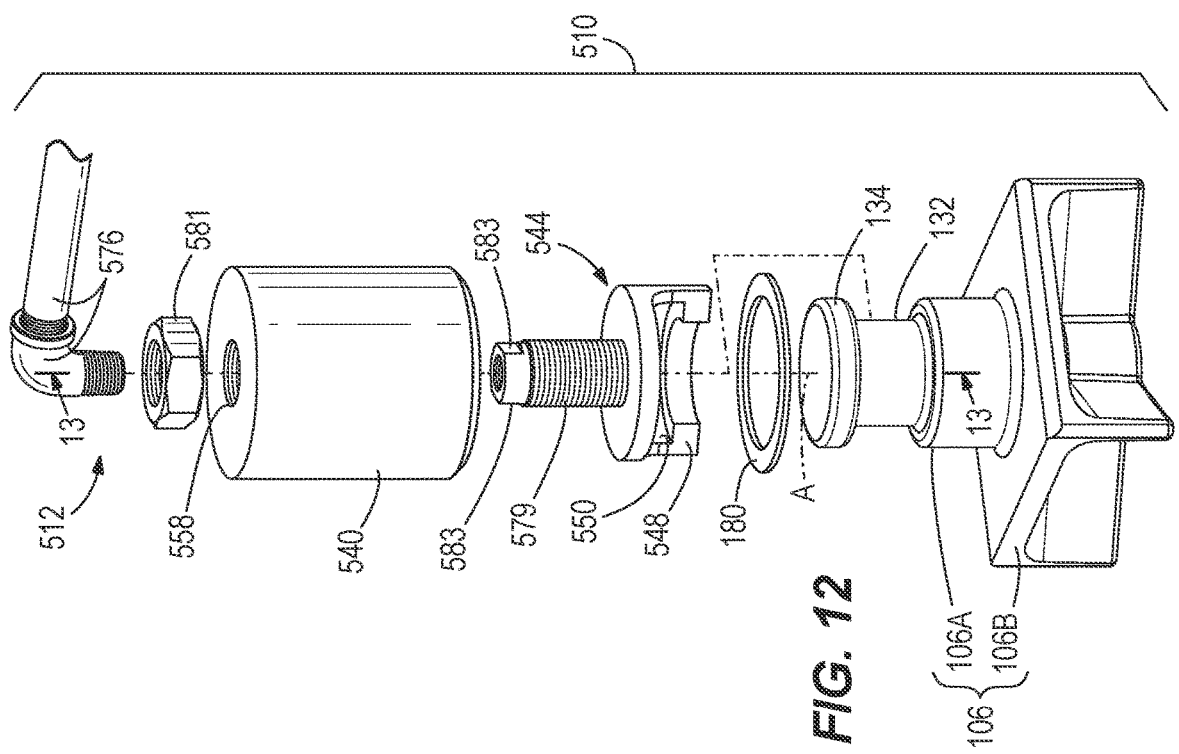
FIG. 12 is an exploded assembly view of a king pin coupler assembly with a shielding apparatus according to a fourth alternate embodiment.

FIGS. 12-13 illustrate a fourth alternate construction in which a shielding apparatus 510 for the king pin 106 of the king pin coupler assembly 102 includes a cover 540 having an end cap portion 542 with an aperture 558 therein. The shielding apparatus 510 further includes a lock plate 544 similar to the lock plate 144 of FIGS. 1-4 as part of the retaining structure for securing the cover 540. For example, the lock plate 544 includes one or more lips or tangs 548 that fit into the neck 132 of the king pin 106, while the head 134 of the king pin is received into a receptacle 550 of the lock plate 544. However, the lock plate 544 includes a threaded nipple portion 579 that extends through the aperture 558 in the cover 540. Once the nipple portion 579 is passed through the aperture 558, a nut 581 may be engaged with exterior threads on the nipple portion 579 and tightened against the end cap portion 542 (e.g., with a gasket therebetween). The nipple portion 579 may further provide part of the vent structure 512 by having a hollow construction. For example, the interior of the nipple portion 579 may be formed with interior threads for receiving a further hollow conduit 576 provided in the illustrated construction by a 90-degree pipe elbow threaded into the nipple portion 579 and a pipe threaded to the other end of the elbow. A part of the nipple portion 579, such as the tip, may be provided with an anti-rotation feature 583. In the illustrated construction, the anti-rotation feature 583 is provided by a pair of flat surfaces, although a hex profile or other non-circular tool-engaging shape may be provided so that the lock plate 544 as a whole may be retained in place by an engaged tool while the nut 581 is tightened against the cover 540. The coupler plate 116 is omitted from FIG. 12 for clarity.

FIGS. 14-15 illustrate a fifth alternate construction in which a shielding apparatus 610 for the king pin 106 of the king pin coupler assembly 102 includes a cover 640. The cover 640 is secured directly to the coupler plate 116. Rather than a bolting flange like the cover of FIGS. 8-9, the cover 640 has, opposite its end cap portion 642, a threaded portion 685 (e.g., male threads) engageable with a threaded portion (e.g., female threads) provided in the coupler plate 116. In particular, the king pin receiving aperture 120 in the coupler plate 116 can be provided as a threaded aperture to receive and engage the cover 640. In some constructions, the shielding apparatus 610 is vented to atmosphere via a vent structure 612, which may be in communication with the interior of the cover 640 via an aperture 658 in the end cap portion 642. For example, the aperture 658 may be formed with interior threads for receiving a hollow conduit 676 provided in the illustrated construction by a 90-degree pipe elbow and a pipe threaded to the other end of the elbow. Although not illustrated, part of the cover 640 may be provided with an anti-rotation feature (e.g., opposed flat surfaces, a hex or other non-circular tool-engaging profile, one or more indentations, etc.) so that a tool may be used to engage the cover 640 and aid in tightening it into the threaded aperture 120.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A method of manufacturing a king pin coupler assembly of a trailer, the method comprising:
providing a coupler plate having a king pin aperture therein;
positioning a king pin within the king pin aperture so that a first portion of the king pin having a neck extends to a first side of the coupler plate and a second portion of the king pin extends to a second side of the coupler plate;
welding the king pin to the coupler plate to fix the king pin in position within the king pin aperture;
applying a shielding apparatus to cover the first portion of the king pin;
immersing the coupler plate, with the king pin welded thereto and shielded by the shielding apparatus, into a hot dip galvanizing bath; and
removing the coupler plate from the hot dip galvanizing bath, and removing the shielding apparatus.

2. The method of claim 1, wherein the first side of the coupler plate, the second side of the coupler plate, the second portion of the king pin, and an exterior of the shielding apparatus are all exposed to the hot dip galvanizing bath, and the first portion of the king pin is entirely shielded from the hot dip galvanizing bath by the shielding apparatus.

3. The method of claim 2, further comprising at least partially covering the second portion of the king pin with a thermally insulating ceramic coating.

4. The method of claim 1, further comprising sealing a first end of the cover to the first side of the coupler plate, and venting an interior of the cover to atmosphere.

5. The method of claim 1, wherein the first end of the cover is sealed to the first side of the coupler plate by compressing a gasket therebetween.

6. The method of claim 1, further comprising securing the cover to the king pin through a retaining structure, the securing including sliding at least one component onto the king pin along a direction transverse to an axial direction of the king pin and securing at least one fastener.

7. The method of claim 1, further comprising at least partially filling an interior of the cover with a heat absorbing liquid.

8. The method of claim 1, further comprising securing the cover in position over the king pin by directly engaging the coupler plate with a retaining structure, and maintaining a spacing between the retaining structure and the king pin.

* * * * *